(12) United States Patent
Warren et al.

(10) Patent No.: US 9,110,879 B2
(45) Date of Patent: *Aug. 18, 2015

(54) GENERATION OF SIMULATED ERRORS FOR HIGH-LEVEL SYSTEM VALIDATION

(71) Applicant: Emulex Corporation, Costa Mesa, CA (US)

(72) Inventors: Bruce Gregory Warren, Poulsbo, WA (US); Carl Joseph Mies, Snohomish, WA (US); William Eugene Morgan, Seattle, WA (US); William Patrick Goodwin, Woodinville, WA (US)

(73) Assignee: EMULEX CORPORATION, Costa Mesa, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/223,493

(22) Filed: Mar. 24, 2014

(65) Prior Publication Data

US 2014/0208162 A1    Jul. 24, 2014

Related U.S. Application Data

(63) Continuation of application No. 14/010,468, filed on Aug. 26, 2013, now Pat. No. 8,726,086, which is a continuation of application No. 12/054,323, filed on Mar. 24, 2008, now Pat. No. 8,522,080.

(51) Int. Cl.

| | |
|---|---|
| *G06F 11/00* | (2006.01) |
| *G06F 11/26* | (2006.01) |
| *G06F 11/263* | (2006.01) |
| *G06F 11/36* | (2006.01) |

(52) U.S. Cl.
CPC ............ *G06F 11/261* (2013.01); *G06F 11/263* (2013.01); *G06F 11/3696* (2013.01)

(58) Field of Classification Search
USPC .......................................................... 714/28
See application file for complete search history.

(56) References Cited

U.S. PATENT DOCUMENTS

| | | |
|---|---|---|
| 5,283,891 A | 2/1994 | Suzuki et al. |
| 5,671,352 A | 9/1997 | Subrahmaniam et al. |
| 6,064,948 A | 5/2000 | West et al. |
| 7,047,176 B2 | 5/2006 | Klevans et al. |
| 7,340,661 B2 | 3/2008 | Groz |
| 2004/0153806 A1 | 8/2004 | Sugimura et al. |
| 2005/0102572 A1* | 5/2005 | Oberlaender .................... 714/29 |
| 2006/0048009 A1* | 3/2006 | Huemiller et al. ............... 714/32 |
| 2006/0168568 A1 | 7/2006 | Ault |
| 2007/0174731 A1* | 7/2007 | Haeberle et al. ................. 714/46 |
| 2009/0240986 A1 | 9/2009 | Warren et al. |

* cited by examiner

*Primary Examiner* — Sarai Butler
(74) *Attorney, Agent, or Firm* — McAndrews, Held & Malloy, Ltd.

(57) ABSTRACT

A device, integrated circuit and method for generating simulated errors are disclosed. In the disclosed device, integrated circuit and method, an original data value is read from a memory. The original data value is intercepted by the integrated circuit. The integrated circuit is operable to virtualize an error in the original data value to generate a modified data value. The integrated circuit is also operable to generate an interrupt according to the virtualization. This disclosure may be particularly useful for high-level memory validation.

20 Claims, 6 Drawing Sheets

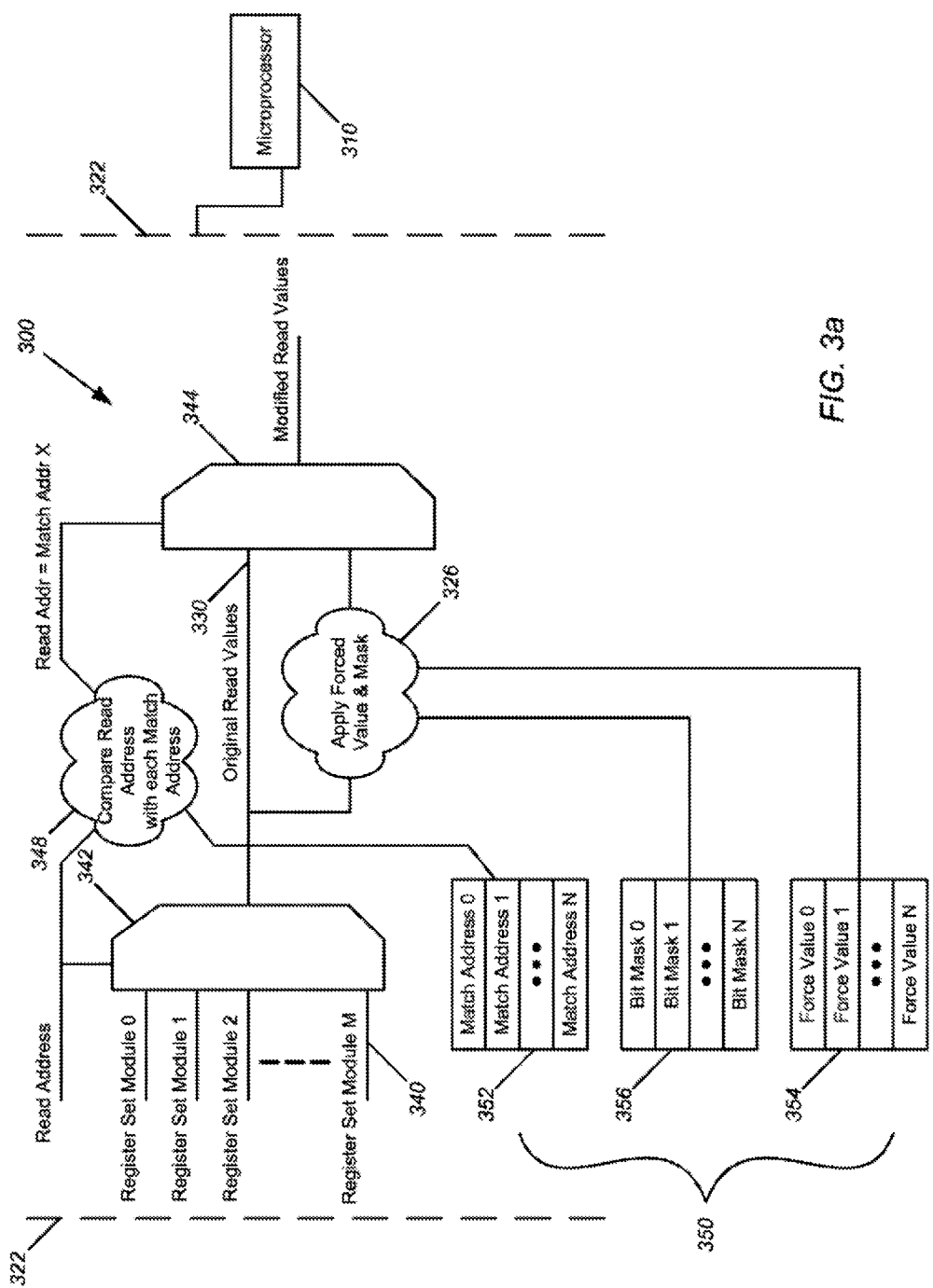

| | Match Address | Modify Bit Mask | Forced Value |
|---|---|---|---|
| 0 | 4000 | 01 | 01 |
| 1 | 0018 | 10 | 10 |
| 2 | 0032 | 80 | 80 (Non-Responsive Disk) |
| ... | ... | ... | ... |
| N | X | Y | Z |

FIG. 3b

GENERATION OF SIMULATED ERRORS FOR HIGH-LEVEL SYSTEM VALIDATION

CROSS-REFERENCE TO RELATED APPLICATIONS

This is a continuation of U.S. patent application Ser. No. 14/010,468, filed Aug. 26, 2013, which is a continuation of U.S. patent application Ser. No. 12/054,323, filed Mar. 24, 2008, now U.S. Pat. No. 8,522,080. The above-referenced United States patent applications are all hereby incorporated by reference in their entirety.

FIELD OF THE INVENTION

This invention relates to high-level system validation, and more particularly, to generating simulated errors for system validation to verify system behavior.

BACKGROUND OF THE INVENTION

After building a computer system, a system designer or software programmer will usually test the system to determine whether it responds appropriately. Generally, a designer may generate errors within the system to test the software and verify that all of the fault cases are covered and that the system handles exceptions correctly. As software and electronic systems continue to become more complex, however, it becomes more difficult to test the system and software for errors and the system's responses to those errors.

As an example, FIG. 1 illustrates a representative system 100 of a conventional enclosure 104. A host bus adapter (HBA) or IOC 102 may be connected to a disk enclosure 104 by Fibre Channel (FC) link 106 or SAS or other communication protocol. A series of drives 108 may be attached to the enclosure 104. Within the enclosure 104, a microprocessor 110 generally controls a switch 112 to connect the various attached devices, other HBAs 102 and drives 108. The microprocessor 110 may include flash memory 114 and RAM 116 and a management interface 118. The management interface may be, for example, Ethernet, RS 232, SCSI Enclosure Services (SES) over FC, or SAS, or a virtual port.

In operation, the microprocessor 110 controls the switch 112 to make the correct connections. When an error occurs at the lowest level, a message may be sent up the chain of command from the switch 112, to the microprocessor 110, to the management interface 118, and to the controlling device. That controlling device then determines the next action and sends the appropriate signals back down the chain of command. For example, the microprocessor may report to a redundant array of independent disks (RAID) controller that a disk has failed. The RAID controller then sends the appropriate controls to rebuild the RAID set to recover from the failed disk. The higher controlling device may be an end user, such as the programmer, a RAID head, or a mainframe computer. A system designer attempts to simulate all possible errors the system may encounter during actual run-time in order to verify that the system responds correctly.

A large system may include dozens of enclosures, multiple RAID heads, and different computers all interacting together. These systems can become very complex. To validate the system, a system designer should ideally attempt to simulate any error that could possibly happen. If an error is not simulated, then that error may cause unanticipated or unexpected results when it occurs in actual performance.

Generally, a software programmer or system designer may wish to test the responses of the upper management system, or the entire system, to determine how the system responds to various errors. To physically cause the errors within a system would be costly, and therefore a programmer may wish to simulate the errors to determine if the system responds appropriately. There are currently two major mechanisms implemented to simulate errors in systems: (1) insertion of test circuitry into the hardware such as an application specific integrated circuit (ASIC); and (2) firmware interception and modification of hardware or ASIC responses.

One option available to a system designer is to connect test devices to the drive ports of the system enclosure. These test devices simulate typical traffic across the system and can also introduce certain errors into the traffic. However, this requires additional hardware. The test equipment would have to be able to trigger the desired errors and be fast enough to simulate the actual run-time errors encountered during the actual performance of the system. The test equipment is generally expensive and bulky and may not be available to some companies. The time to test each possible error for each possible device drive by physically attaching test equipment can be time and cost prohibitive. Therefore, this option is generally not available to most designers.

The system designer may alternatively design the ASIC to generate faults and corrupt data under test. The ASIC can be designed with additional hardware and software to generate test errors. However, given the constantly increasing complexity of ASICs, insertion of test circuitry to force a significant amount of error cases to be covered can become a major design effort, rivaling the complexity of the original design. Since the design is within the ASIC, the errors that can be generated are limited to those that were designed into the chip. Therefore, the test designer must be extremely knowledgeable about the details of the design and the impact that any low-level error has on the larger system to foresee and incorporate any desired test errors into the ASIC design. Using this methodology, a significant portion of the design implementation may be fault insertion circuitry. Not only does the additional circuitry increase die size and associated cost, but the additional logic increases the probability of soft errors and increase power consumption required of the device.

The final alternative is to provide software within the upper management system, such as the microprocessor, to simulate error reads. Software is used to modify the data read from the chip, and the microprocessor sends the modified data to the upper levels of management. The system is run in a "test mode," alerting the microprocessor that the modified data should be used instead of the actual data read from the ASIC. However, the additional software requires processing time, which slows the performance of the entire system, even when it is not being tested. Modifying the status information read from the ASIC in firmware modifies the behavior of the code being tested and/or introduces overhead into all operations performed by the firmware. The firmware must read the status from the ASIC, determine if it is in test mode, and then branch, either fetching data to modify the original status or performing the normal operation on the data. In real-time systems, the overhead servicing test modes could result in significant differences from normal run-time operations, possibly causing abnormal behavior that does not exist in the real code or masking issues that do exist. Additionally, it is difficult to isolate the effects of the function initiating the test and the run-time firmware's response.

SUMMARY OF THE INVENTION

Embodiments of the present invention are directed to enabling error simulation for system validation. Embodiments of the invention provides a flexible mechanism to aid in validating software responses from the application programming interface level, enclosure management level, to the system level. It may allow any response or sequence of responses from an ASIC to be easily generated, supporting the test and debug of system firmware and software. By modifying readback statuses and interrupt behavior at the processor interface, the test circuit may be easy to implement with low risk of adversely impacting the ASIC design.

Errors can be simulated by modifying data presented to the processor as well as generating interrupts consistent with the modified data in the ASIC hardware. According to embodiments of the present invention, the ASIC includes logic and hardware to simulate errors to test the software responses of the higher management system, above the ASIC. Modify logic may be added to the ASIC, so when the microprocessor attempts to read a specific address, the modify logic may modify the data depending on the test configuration and the requested address. In a test mode, the original read values may be intercepted and modified by the modify logic before it is sent to the microprocessor, based on the configuration of registers. The modify logic may force values to be set or cleared depending on the address accessed by the microprocessor matching a value programmed into a register set. The ASIC may also include selection logic to determine whether data from the modify logic or the unmodified value from a device should be sent to the ASIC interface and on to the microprocessor. The ASIC then sends the information up to the microprocessor, and up to the management interface where software can determine the appropriate course of action.

The ASIC logic may also include interrupt logic and a timer. The interrupt logic can send an appropriate interrupt signal to the microprocessor to alert the system of an event occurrence. The interrupt logic may be connected to a timer, and the timer may be configured to activate the interrupt logic after a delay so that the system may return to a steady state before an error signal is generated. Therefore, the programming of the desired modifications within the modify logic may be separated in time from the occurrence of the error event, so as to not interfere with the actual error detection and error handling code paths of the system. Embodiments of the present invention therefore allow an extensive range of firmware/software/system code paths to be exercised.

Embodiments of the invention may allow simulated errors to be generated to validate the firmware's handling as well as system-level software handling of errors that may not easily be recreated by manipulation of the system under test. Virtualizing the errors at the processor interface may provide a non-intrusive methodology that may give a significant amount of flexibility in testing without burdening the ASIC with large amounts of test circuitry.

BRIEF DESCRIPTION OF THE DRAWINGS

FIG. 3A illustrates one exemplary embodiment of ASIC hardware to accomplish aspects of the current invention.

FIG. 3B illustrates a representative registry to store the user input to generate errors according to aspects of the invention.

DETAILED DESCRIPTION OF THE PREFERRED EMBODIMENT

In the following description of preferred embodiments, reference is made to the accompanying drawings which form a part hereof, and in which it is shown by way of illustration specific embodiments in which the invention may be practiced. It is to be understood that other embodiments may be utilized and structural changes may be made without departing from the scope of the preferred embodiments of the present invention.

Embodiments of the present invention are directed to enabling error simulation for system validation. Embodiments of the invention provides a flexible mechanism to aid in validating software responses from the application programming interface level, enclosure management level, redundant arrays of independent disks (RAID) controller to the system level. It can allow any response or sequence of responses from an ASIC to be easily generated, supporting the test and debug of system firmware and software. By modifying only the readback statuses and interrupt behavior at the processor interface, the test circuit can be easy to implement with low risk of adversely impacting the ASIC design.

Errors can be simulated by modifying data presented to the processor as well as generating interrupts consistent with the modified data in the ASIC hardware. The normal traffic flow of the system may not be interrupted. Also, timers may be used to delay error activation permitting the test injection calls to be completed and permitting the system to return to steady-state operation before generating the test error. The system's behavior/response may not be modified due to the test code injecting the error; the system software implementation and run-time operation is only affected by the simulated error. A detailed evaluation of the ASIC before construction is not required. The only consideration that may need to be taken into account is the number of register reads that need to be modified for a single error to support the maximum decision tree depth the processor would need to access. Embodiments of the present invention therefore allow an extensive range of firmware/software/system code paths to be exercised.

Although embodiments of the invention may be described herein primarily in terms of ASIC designs within a switch of an enclosure, it should be understood that embodiments of the invention are not so limited, but extend to other compatible devices, and can be implemented with any system using a microprocessor interface. Embodiments of this invention may be used with any closed system, including any device not easily changed after it is incorporated into a product, such as, for example, a FPGA, a circuit board, an ASIC, a switch enclosure, or a computer within an enclosure. Embodiments of the invention may be used with any system utilizing a microprocessor interface, including, for example, a storage area network.

Figure 1:
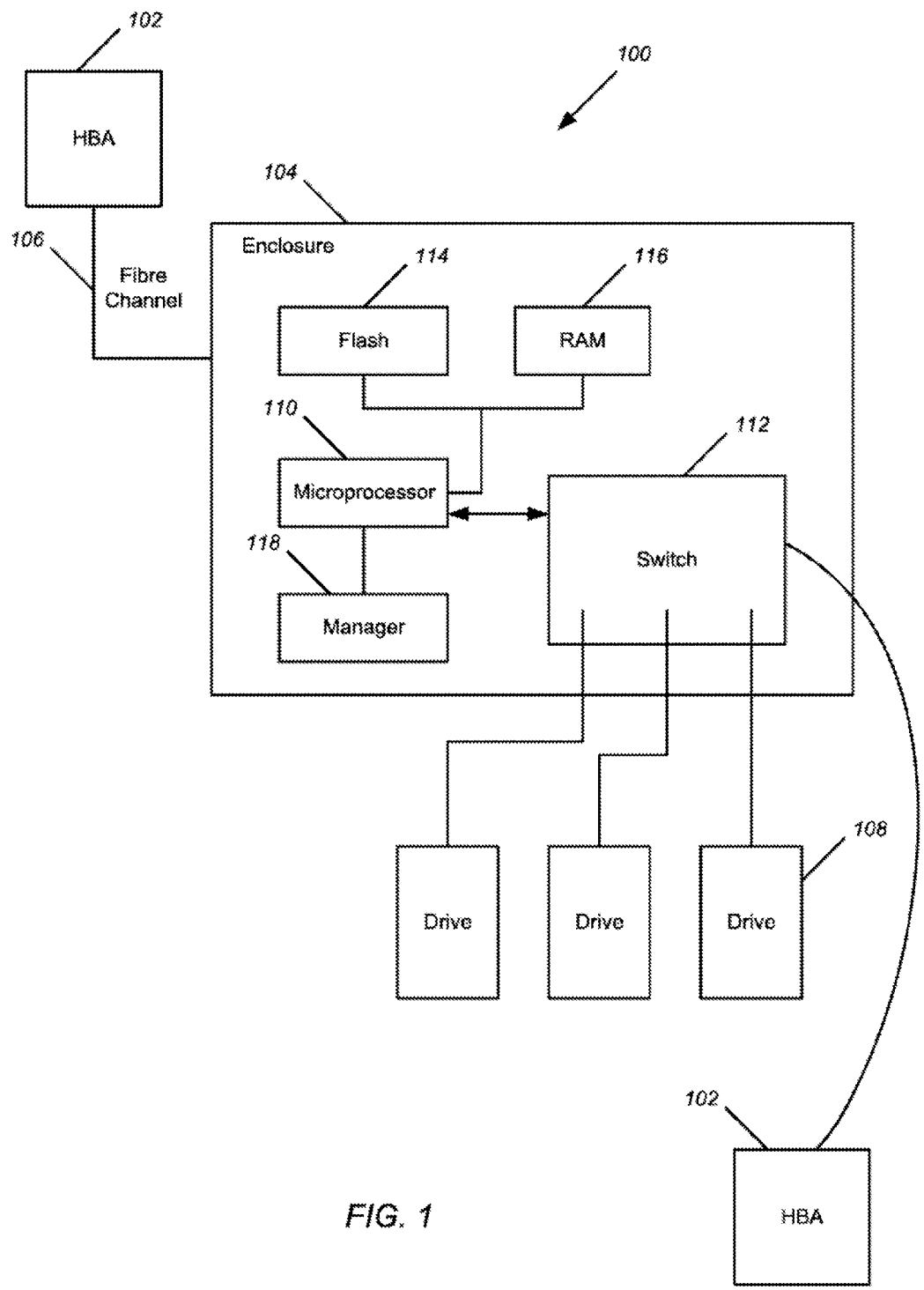
FIG. 1 illustrates a representative system of a conventional enclosure.
Figure 2A:
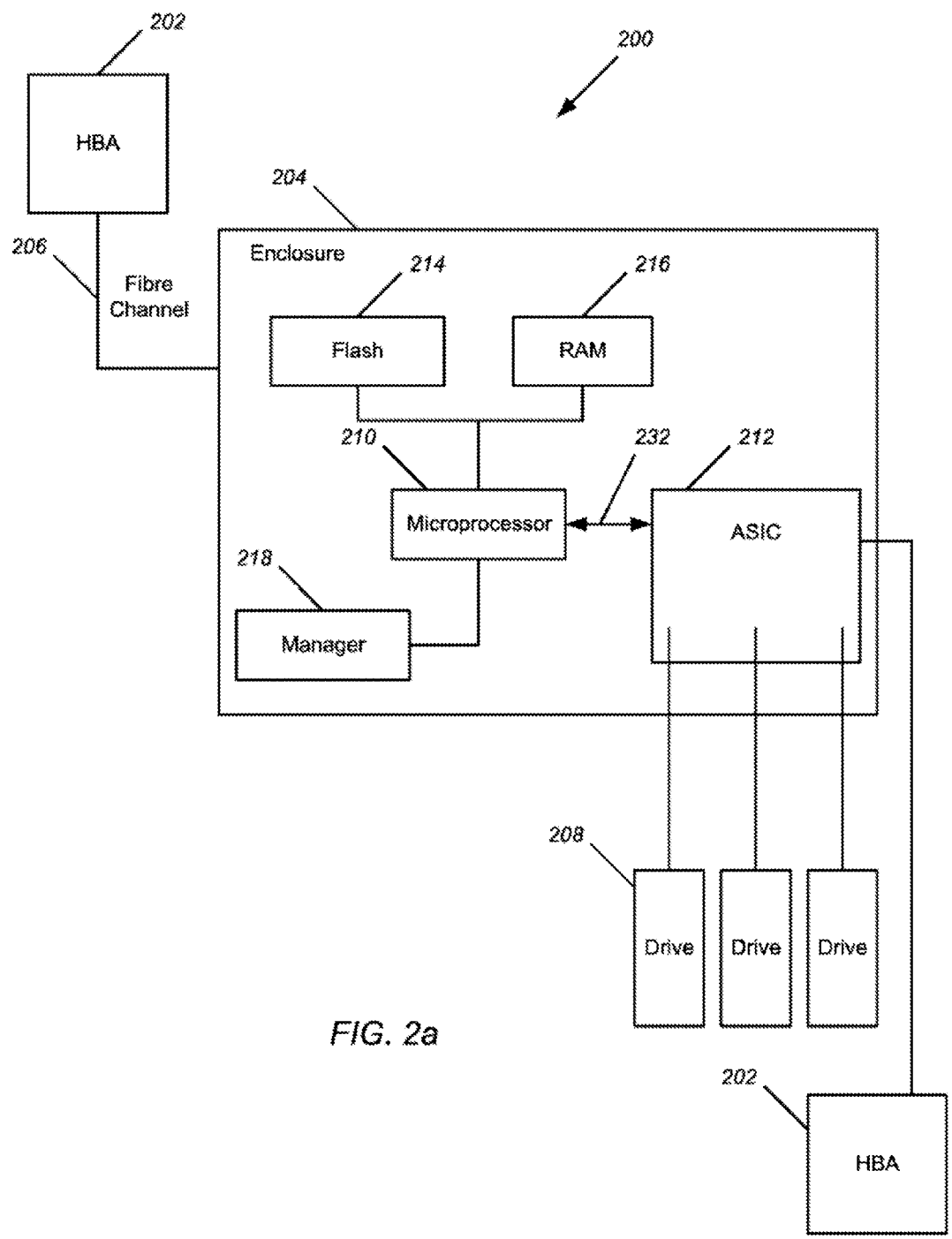
FIG. 2A illustrates an exemplary enclosure system utilizing embodiments of the present error validation system.

FIG. 2A illustrates an exemplary enclosure system 200 utilizing embodiments of the present error validation system. HBA 202 may be connected to the enclosure 204 by a FC link 206. Drives 208 may be connected to the enclosure 204. Within the enclosure 204, an ASIC 212 controls the switch logic of the drive 208 interface. The ASIC 212 communicates with the microprocessor 210. The microprocessor 210 includes memory, such as FLASH memory 214 or RAM 216. A local management system 218 controls the enclosure logic.

According to embodiments of the present invention, the ASIC 212 includes logic and hardware to simulate errors to test the software responses of the higher management system, above the ASIC.

Figure 2B:
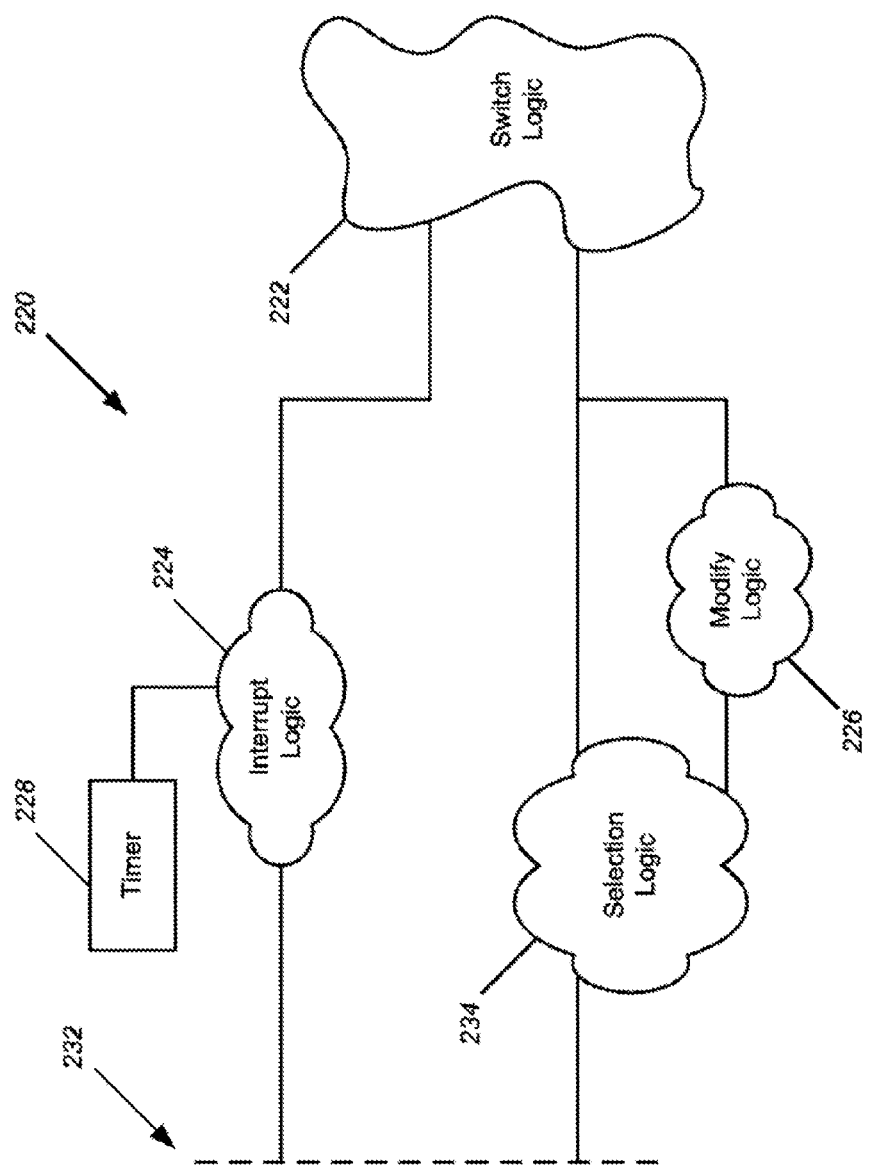
FIG. 2B illustrates exemplary ASIC logic according to aspects of the present invention.

FIG. 2B illustrates exemplary ASIC logic 220 according to aspects of the present invention. The ASIC logic 220 may include switch logic 222, modify logic 226 and selection logic 234. Modify logic 226 is added to the ASIC 212, so when the microprocessor 210 attempts to read a specific address, the modify logic 226 may modify the data depending on the test configuration and the requested address. The modify logic, using gates or a state machine, may be configured to modify the data transmitted over the datapath 230 originally received from the switch logic 222. When the microprocessor 210 requests information concerning a particular address, the ASIC 212 may use the switch logic 222 to access information at the particular address. The modify logic 226 may determine whether an error should be sent for that particular address.

The selection logic 234, configured from gates or a state machine, determines whether data from the modify logic 226 or the unmodified value on datapath 230 should be sent to the ASIC interface 232 and on to the microprocessor. If the information associated with the requested address should be modified, the selection logic 234 may send the modified error information to the ASIC interface 232. However, if the selection logic 234 determines that the address is not to be modified, the actual information from the switch logic 222 available on datapath 230 may be sent to the ASIC interface 232. The ASIC 212 then sends the information up to the microprocessor 210, and potentially up to the HBA 202 and/or up to the management interface 218 where software can determine the appropriate course of action.

The ASIC logic 220 may also include interrupt logic 224 and a timer 228. The interrupt logic 224 can send an appropriate interrupt signal to the microprocessor 210 to alert the system 200 of an event occurrence. The interrupt logic 224 may be a state machine to generate a signal to the processor to alert the processor that an event has occurred. The interrupt logic 224 may be connected to a timer 228, and the timer 228 may be configured to activate the interrupt logic 224 after a delay so that the system 200 may return to a steady state before an error signal is generated. Therefore, the programming of the desired modifications within the modify logic 226 may be separated in time from the occurrence of the error event, so as to not interfere with the actual error detection and error handling code paths of the system. The modify logic may alternatively be programmed through an alternate path, such as an RS-232.

As an example of one embodiment of the invention, a user may program a test configuration, which includes providing the addresses of the registers to be modified along with the modifications to simulate the desired error. The interrupt logic 224 then waits a specified amount of time, using the timer 228, before an interrupt signal is sent, alerting the microprocessor of an error. When the microprocessor 210 reads the status of the ASIC 212 to determine the reason for the interrupt, if a requested address matches that of the user input, then the modify logic 226 sends the data from the device modified by the user's test configuration. The modified data is then sent to the microprocessor 210 from the ASIC 212, the system may detect and process the simulated error, and the user may then determine if the system reacted appropriately. If the requested address from the microprocessor 210 does not match the test device address inputted by the user, then the unmodified data retrieved from the switch logic 222 may be sent to the microprocessor 230. Therefore, a user can simulate any error, reportable through the ASIC's processor interface, such as a bad clock, a detached device, etc., after the ASIC has been designed and implemented.

FIG. 3A illustrates one embodiment of ASIC 300 hardware, including registers 350, to accomplish aspects of the current invention. The ASIC 300 includes a multiplexer 344, registers 350, and additional logic, including modify logic 326 and test address match logic 348 to accomplish aspects of the invention. Under general use, the logic of the ASIC 300 connects the enclosure ports' status and control register outputs 340, through multiplexer 342 to the microprocessor 310 via datapath 330 and through an interface of the ASIC 322. In a test mode, the original read values 330 may be intercepted and modified by the modify logic 326 before it is sent to the microprocessor 310 based on the configuration of registers 350. The modify logic may force values to be set or cleared depending on the address accessed by the microprocessor matching a value programmed into register set 352. A match causes test address match logic 348 to select the input to multiplexer 344 from the modify logic 326 to be presented to the microprocessor interface 322.

FIG. 3B illustrates a representative registry 350 to store the user input to generate errors according to aspects of the invention. In one embodiment, three types of registers may be used for modifying the readback status: match address 352, bit mask 356, and forced value 354. For complex error scenarios, multiple sets of these registers may need to be implemented. At the time of designing the ASIC, the designer only needs to determine how many entries within the register may be desired. The error generation, including the desired address and desired error, can be modified within the registers at any time. The number of entries may depend on the complexity of the decision tree the microprocessor uses to locate a specific error. The number of entries should be at least equal to the longest path the microprocessor could use to determine the specific error. Therefore, the register 350 has N entries to accommodate the longest decision tree path the microprocessor 310 could traverse to determine the error.

The registers 350 are externally programmable. Therefore, a system or user outside the ASIC may program the entries of the registers with a desired address location to simulate a desired error, and the bit mask and forced value to simulate the desired error. These registers may be programmed at any time after the design of the ASIC. Therefore, the initial design of the ASIC does not have to be altered depending on the desired error to be generated; the error data and desired address need only be externally programmed into the registers. The registers 350 configured for storing address data and error data, including the bit mask and force values, are devices externally programmable to store the desired information to be retrieved at a later time by the system.

Once these values are stored in the appropriate registers, the microprocessor, according to its decision tree logic, checks for the event by sending address requests and receiving information concerning the location and nature of the event.

Comparison logic 348 then may compare the values contained in the match address register set 352 against the address of any read request from the microprocessor 310. The comparison logic 348, such as gates or a state machine, may be configured to compare the entries of the address register set 352 with the read request address from the microprocessor 310 and may determine whether there is a match or not, and, if necessary, the entry location of the register of the matching address.

In the case of an address match, the output multiplexer 344 feeding the processor's bus may output the modified data 326 instead of passing through the original read values 330. The bit mask register 356 allows bit-level control of the values of the bits to be modified. This fine level of control permits the test to run in a background mode, reacting to normal status bits or to arbitrarily modify any or all bits, ignoring real-time behavior. Only unmasked bits may be modified by the test circuit. The data value register 354 contains the forced value to apply to the original data. Bits allowed by the mask register may be forced onto the original status read. The remaining bits may be unchanged.

The ASIC 300 includes logic and hardware 348 to compare the read address by the microprocessor 310 with the inputted addresses in the match address register 352. This comparison controls the multiplexer 344 selection to return an original value read 330 or a modified value altered by the modify logic 326. Therefore, if the address requested by the microprocessor is not in the match address register 352, then the microprocessor may receive the unmodified data from the ASIC register set 340. Since the address does not match an address in the register set 352, the multiplexer 344 may send data to the microprocessor 310 from the original read datapath 330 from the register set module 340. If, however, the microprocessor is requesting information from an address in the match address register 352, then the modify logic 326 may use the modify bit mask register 356 and the forced value register 354 to modify the received data from the register set module 340. The multiplexer 344 may then select the modified data and send it to the microprocessor 310, simulating an error.

For example, in FIG. 3B, if a user wants to test the system's response to a failure at port 0 resulting from a non-responsive disk, three sets of modification registers can be configured: (1) a port-level error detect register can be configured with the low-level error status; (2) a port-level interrupt status register can be configured with the second level decision on error type; and (3) the router-level interrupt status register can be configured with the first level decision on the module causing the interrupt. These may be stored as three separate entries in the register sets for the address, bit mask, and force value. Therefore, if a user inputs addresses 4000, 18, and 32, for example, those values would be entered into the match address register 352 at entry 0, 1, and 2 to represent the router-level interrupt status (located at address 4000), the associated port-level interrupt status register (located at address 18), and the cause of the interrupt (located at address 32). The user may then choose to modify bit 0 of address 4000, bit 4 of address 18, and bit 7 of address 32, so the values 01, 10, and 80 would be entered into entries 0, 1, and 2 of the modify bit mask registry 356. These values represent the bit location to be masked by the modification logic. Finally, the user can input the values the masked bits are to be changed to, corresponding to the desired error. So, for example, if a user wants to modify bit 1 of address 4000 to a 1 (indicating an event occurrence at port 0), bit 4 of address 18 to 10 (indicating an error address), and bit 8 of address 32 to 80 (indicating that the error is a non-responsive disk), these values would be entered into the forced value registry 354 in the 0, 1, and 2 entries.

Therefore, if the microprocessor requests information from address 4000, the modify logic 326 would mask bit 0 with the force value 1, as read from entry 0 of the register 350. This modification may indicate to the microprocessor that the error occurred at port 0. The microprocessor then requests information from port 0, which in this example, would be address 18. The test address match logic 348 would recognize the address in the match address register 352, and the modify logic would mask bit 4 with force value 1, which, for this example may indicate the error registry as 32. Finally, the microprocessor would send a read request to address 32, and again the test address match logic 348 and the modify logic 326 would mask bit 8 to the value of 80 (non-responsive disk). The microprocessor would then determine that port 0 had an error of a non-responsive disk. The microprocessor would then respond, and the rest of the system software, up the control chain, would react to that error. The user could then determine whether the system responded appropriately for the given error. The entire software of the system may be verified from the ASIC interface 332 all the way to the highest control, a command head or mainframe computer.

Enable and mode registers may also be used to enable the data modification and to control the test or system behavior. The ASIC may include various functions to permit a subset of possible behavior modes. A Global Test Enable function may be included as a master enable for the test circuit to ensure that non-atomic setup of the test registers does not occur unintentionally. Therefore, regardless of the address or information in the registers 350, the test mode could be turned off and original read datapath values 330 would be sent to the microprocessor 310. An Address Set Enable function may be included as an enable for each set of address, mask and data registers, controlling how many different address match registers are actively used at a given time. The function keeps track of all the valid entries in the register 350, so that if data had not been cleared in a register, it does not generate an unwanted error. For example, this function would enable entries 0, 1, and 2 in the above example associated with FIG. 3B, and the other register entries would be deselected, so retained data in register N would not generate an unwanted error. A One-shot or Continuous function may be used as a register modification to apply the test mode only once per test or apply the test mode persistently, lasting until an explicit disable is given or the error is determined. A Generate Interrupt function may be included as an enable for the generation of an interrupt to initiate a sequence of processing. A Clear Interrupt Control function may control which address read clears the interrupt. Therefore, the interrupt signal may be cleared after the first address is read if there is a transient problem being simulated, or it may be cleared after multiple address reads and the problem is fixed as if there is a more persistent error being simulated. This allows actual ASIC behavior to be closely modeled. Also, a Delay Timer function may delay activation of the test to allow test setup to be decoupled from the actual test; this delay controls a timer to determine when the interrupt may be sent to the microprocessor. Any of these functions may be used singularly or in combination.

Figure 4:
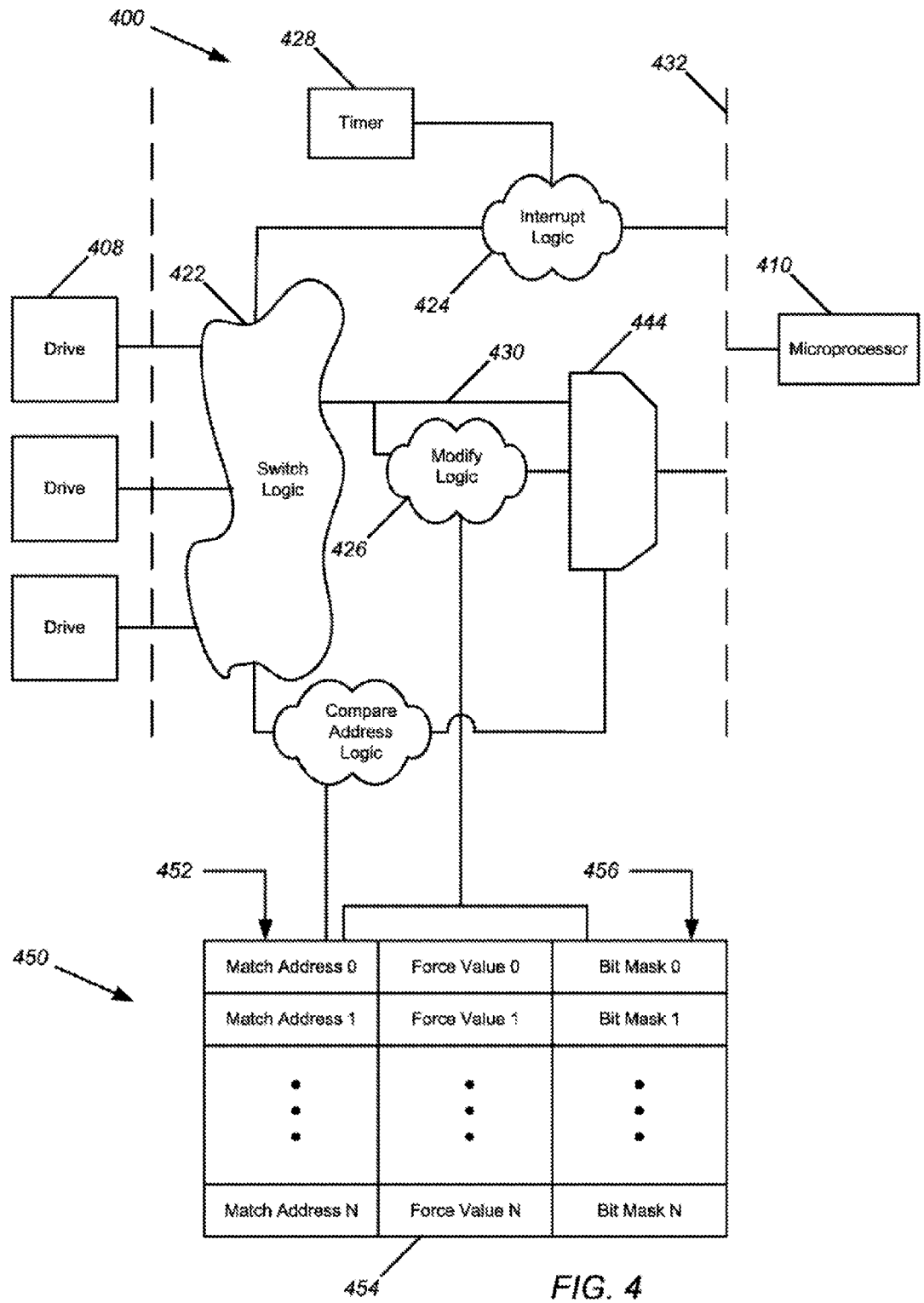
FIG. 4 illustrates one exemplary embodiment of the error simulation of the present invention utilizing potential optional functions.

FIG. 4 illustrates another example of the operational scenario of one embodiment of the error simulation of the present invention utilizing potential optional functions as described above. To simulate this scenario, three sets of modification registers may be configured: (1) a port-level error detect register can be configured with the low-level error status; (2) a port-level interrupt status register can be configured with the second level decision on error type; and (3) the router-level interrupt status register can be configured with the first level decision on the module causing the interrupt.

Using the Clear Interrupt Control function, if the error is just a notification, the test circuitry may be configured to clear the interupt on the read of the router-level interrupt status register. If an action needs to be taken to resolve the error, the interrupt could be configured to be cleared on the read of the port's low-level status register.

After the modification registers have been configured and the interrupt strategy set, using the Generate Interrupt function, the enables for the required register groups may be set, using the Address Set Enable function. Additionally, the delay timer may be set, indicating the time delay before readback modification logic is activated and the interrupt is generated, using the Delay Timer function.

After the delay expires, determined by a timer 428, the interrupt may be generated at 424, causing the firmware's normal interrupt processing routines to execute. The firmware and software will then react as if the actual error occurred. After each modified register is read, the modification circuit for that register may be disabled automatically by hardware, assuming one-shot configuration, eliminating the need to disable the test modifications after the simulated error injection has occurred. A user may utilize either the One-shot or Continuous function to disable a register after it is read, or may use the Clear Interrupt Control function after the simulated error injection has finished.

The invention adds hardware to modify the status information received from the switch logic 422 in order to simulate a desired error. When a user wants to simulate an error, a command can be sent from the upper management interface, such as, for example, a laptop. The user can send four types of commands: (1) the address (port or device) where the error is simulated (stored in register 452); (2) the bit within the data stored at the address to modify to indicate an error (stored in register 456); (3) the desired data for that bit location (the error status) (stored in register 454); and (4) a time lapse before the error simulation is executed. The information may be sent over a write bus and stored in registers 450 within the ASIC 400. The timer 428 then waits the appropriate time, determined by the fourth input command, utilizing the Delay Timer function. A test interrupt signal 424 may then be sent to the microprocessor 410. The microprocessor or the higher management system then runs its system response (the item under test). The system then uses varying logic to determine the nature and location of the error.

The microprocessor 410 may read various register addresses to determine what the simulated error may be, sending requests to addresses to retrieve information in a systematic fashion. The request may be compared 448 to the changed addresses previously written by the user 452. If the address is not one to be tested by the user, and is not in the register, the test address match selection line 446 to the multiplexer 444 may be set to retrieve information 430 directly from the switch logic 422 and physical connections 408. However, if one of the registers does contain the address, then the selection changes so the multiplexer 444 retrieves the modified status information from the modify logic 426 and register information 450 instead of directly from the switch logic 422. The modify logic 426 may modify only the bits per the mask in register 456, passing the non-masked bits from the switch logic 422.

This permits any chip to be tested for any error as it may be determined, after the chip has been created. Design time may be utilized at the time of testing to determine the desired address, bit location, and mask value to use to simulate various errors. However, that can be determined at any time after creating the chip, and little need be known about the chip ahead of time.

Also, by using the timer before the test interrupt is sent, the system may be permitted to re-enter a steady state. Therefore, the request and programming to initiate the error does not interfere with the response to the error. The system simulates a real life occurrence of an error that can occur at any time. The program requests to simulate the error may not mask or create actual problems.

Although the present invention has been fully described in connection with embodiments thereof with reference to the accompanying drawings, it is to be noted that various changes and modifications will become apparent to those skilled in the art. Such changes and modifications are to be understood as being included within the scope of the present invention as defined by the appended claims.

What is claimed is:

1. A device comprising:
   logic operable to request information concerning an address of a storage, the requested information corresponding to original data of the storage; and
   an integrated circuit operably coupled to the processor, the integrated circuit operable to:
   intercept the original data,
   virtualize an error in the original data by generating modified data, and
   generate an interrupt according to the virtualized error.

2. The device of claim 1, wherein the device comprises the storage.

3. The device of claim 1, wherein the original data comprises an original read value.

4. The device of claim 1, wherein the integrated circuit comprises modify logic coupled to the storage, the storage storing an original read value.

5. The device of claim 4, wherein the modify logic is operable to modify the original read value by error data, thereby generating the modified data to virtualize the error in the original data.

6. The device of claim 1, wherein the integrated circuit comprises selection logic operable to select either the modified data or the original data according to a comparison between a stored address data and a requested address.

7. The device of claim 1, wherein the interrupt indicates that the modified data is selected.

8. The device of claim 1, wherein the interrupt is delayed by a predetermined delay time.

9. The device of claim 1, wherein the virtualized error in the original data is virtualized according to a location in a bit mask register.

10. The device of claim 1, wherein the device comprises a register operable to store error data, wherein the modified data is generated based on the error data,
   wherein the register is within a closed system and the error data of the register is programmable from outside the closed system.

11. A method comprising:
   accessing an original data value from a storage;
   intercepting the original data value by an integrated circuit;
   virtualizing an error in the original data value by generating a modified data value; and
   generating an interrupt according to the virtualized error.

12. The method of claim 11, wherein virtualizing an error in the original data value comprises modifying the original data value by error data.

13. The method of claim 11, wherein the method comprises selecting either the modified data value or the original data value according to a comparison between a stored address data and a requested address.

14. The method of claim 11, wherein the interrupt indicates that the modified data value is selected.

15. The method of claim 11, wherein the method comprises delaying the interrupt by a predetermined delay time.

16. The method of claim 11, wherein the virtualized error in the original data value is virtualized according to a location in a bit mask register.

17. The method of claim 11, wherein the modified data value is generated based on error data programmed from outside a closed system.

18. An integrated circuit comprising:
   access logic operable to access an original data value from a storage;
   intercept logic operable to intercept the original data value;
   virtualization logic operable to virtualize an error in the original data value by producing a modified data value; and
   interrupt logic operable to generate an interrupt according to the virtualized error.

19. The integrated circuit of claim 18, wherein the virtualization logic is within a closed system, wherein the virtualization logic is operable to be programmed from outside the closed system.

20. The integrated circuit of claim 18, wherein the interrupt logic is operable to delay the interrupt by a predetermined amount of time.

* * * * *